March 30, 1937. W. A. KUEBLER 2,075,209
ELEVATOR FOR CONVEYER TRUCKS
Filed Aug. 3, 1935 7 Sheets-Sheet 1

INVENTOR.
Walter A. Kuebler
BY
ATTORNEY.

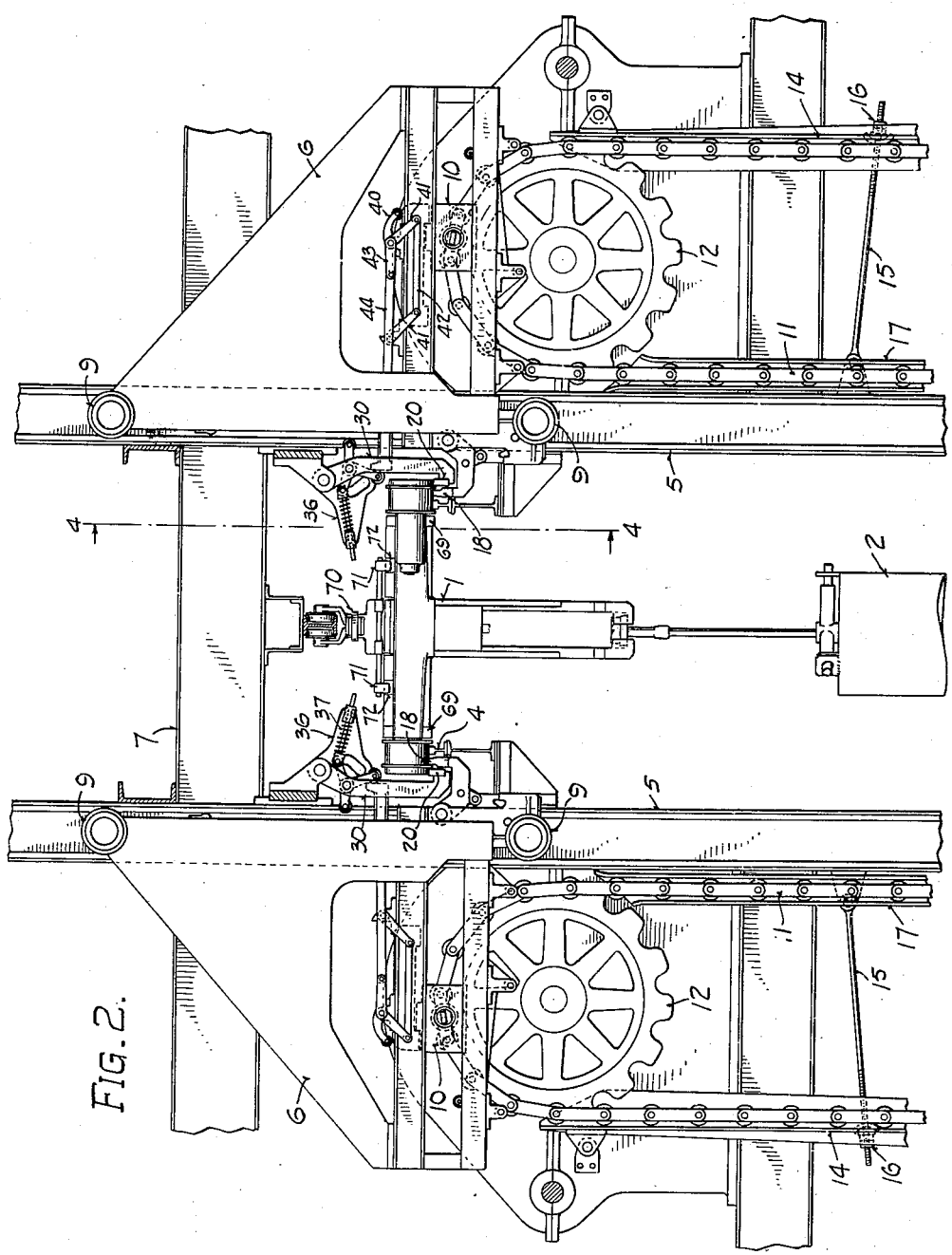

March 30, 1937.  W. A. KUEBLER  2,075,209
ELEVATOR FOR CONVEYER TRUCKS
Filed Aug. 3, 1935  7 Sheets-Sheet 3
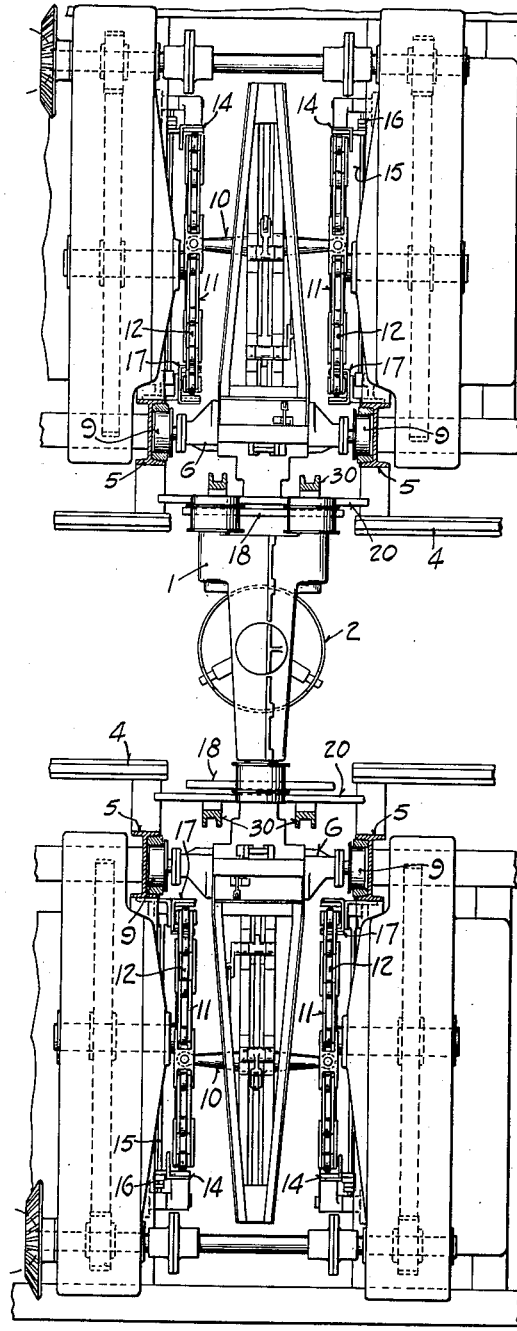
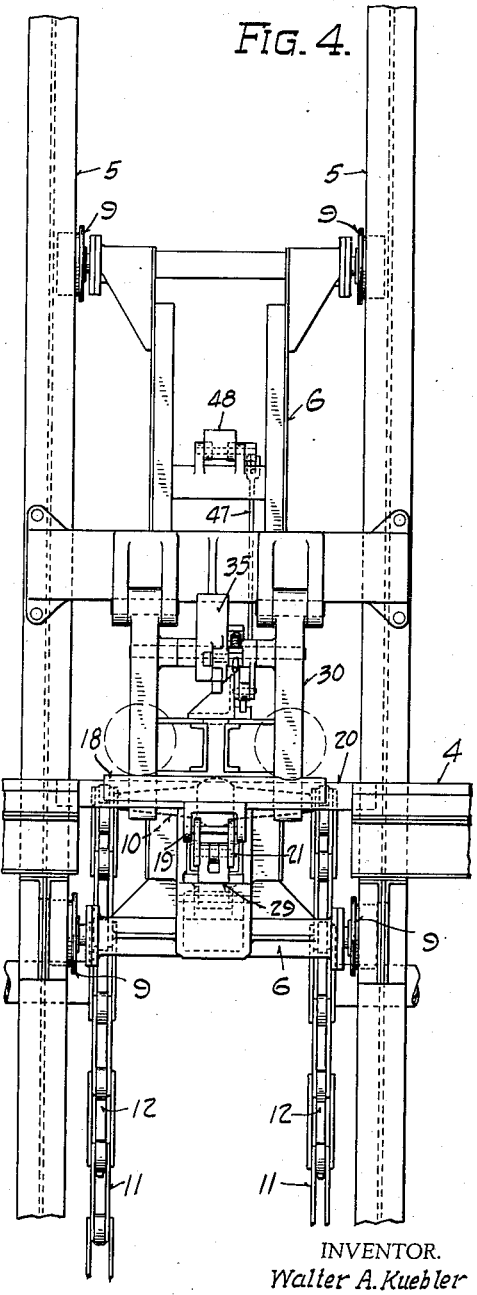
INVENTOR.
Walter A. Kuebler
BY
ATTORNEY.

March 30, 1937. W. A. KUEBLER 2,075,209
ELEVATOR FOR CONVEYER TRUCKS
Filed Aug. 3, 1935 7 Sheets-Sheet 4

INVENTOR.
Walter A. Kuebler
BY
ATTORNEY.

March 30, 1937. W. A. KUEBLER 2,075,209
ELEVATOR FOR CONVEYER TRUCKS
Filed Aug. 3, 1935 7 Sheets-Sheet 6
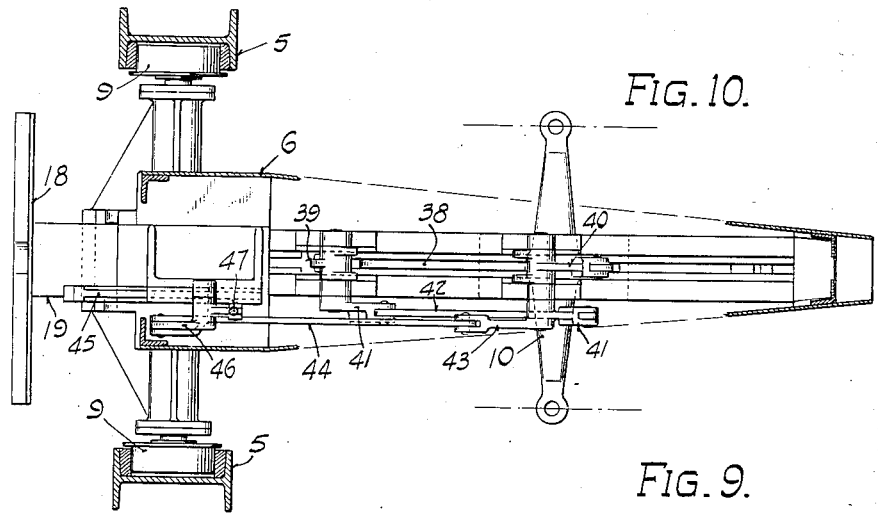
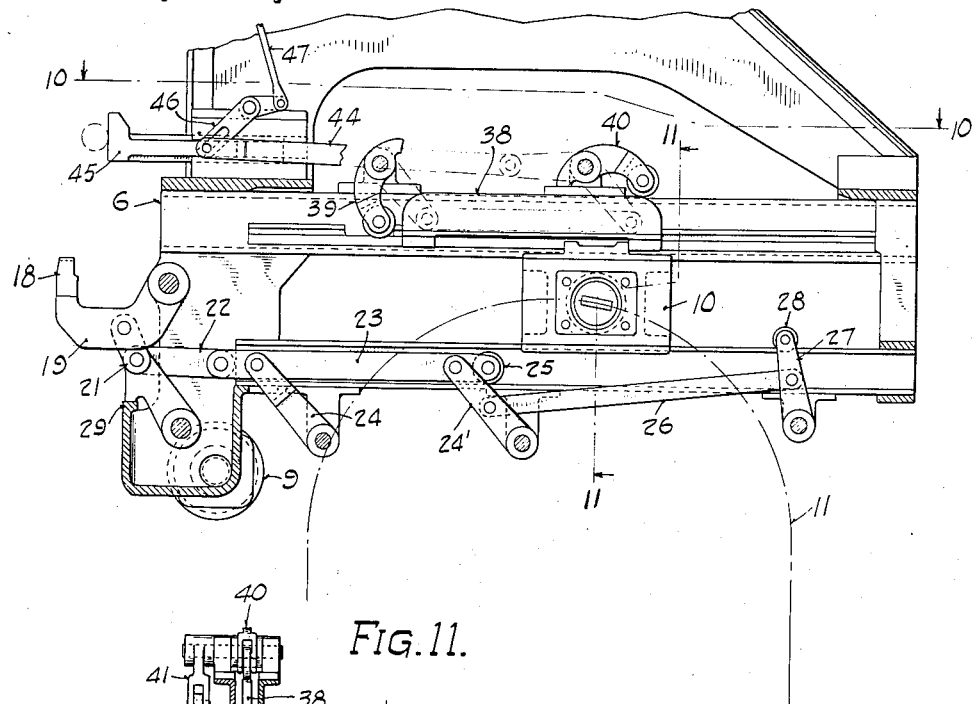
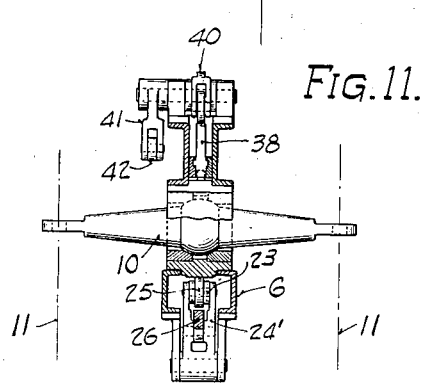
INVENTOR.
Walter A. Kuebler
BY
ATTORNEY.

March 30, 1937. W. A. KUEBLER 2,075,209
ELEVATOR FOR CONVEYER TRUCKS
Filed Aug. 3, 1935 7 Sheets-Sheet 7

INVENTOR.
Walter A. Kuebler
BY
ATTORNEY.

Patented Mar. 30, 1937

2,075,209

UNITED STATES PATENT OFFICE 2,075,209

ELEVATOR FOR CONVEYER TRUCKS

Walter A. Kuebler, Milwaukee, Wis., assignor to A. O. Smith Corporation, Milwaukee, Wis., a corporation of New York Application August 3, 1935, Serial No. 34,511

12 Claims. (Cl. 104—128)

This invention relates to an elevator for conveyer trucks and more particularly to an elevator for transferring conveyer trucks or the like from one level to another, as for instance from one conveyer track to another at a different level.

One of the objects of the invention is to provide an elevator operated from the same drive as the conveyer or in synchronism with the conveyers for transferring successively the trucks from one conveyer to another.

Another object is to provide means for preventing miscarriage of the trucks during transfer from the conveyer tracks to the position for vertical movement by the elevator and vice versa.

Another object is to provide an improved drive for the elevator.

Other objects will appear hereinafter.

The invention is illustrated in the accompanying drawings in which:

Fig. 2 is an enlarged view of the upper end of Figure 1 showing the elevator at the top of the shaft;

Fig. 3 is a top plan view of the elevator partly in section;

Fig. 4 is a vertical section taken on line 4—4 of Fig. 2 without the truck;

Fig. 9 is an enlarged view showing part of Fig. 7 in section;

Fig. 10 is a horizontal section taken on line 10—10 of Fig. 9;

Fig. 11 is a section taken on line 11—11 of Fig. 9; and

Figure 1:
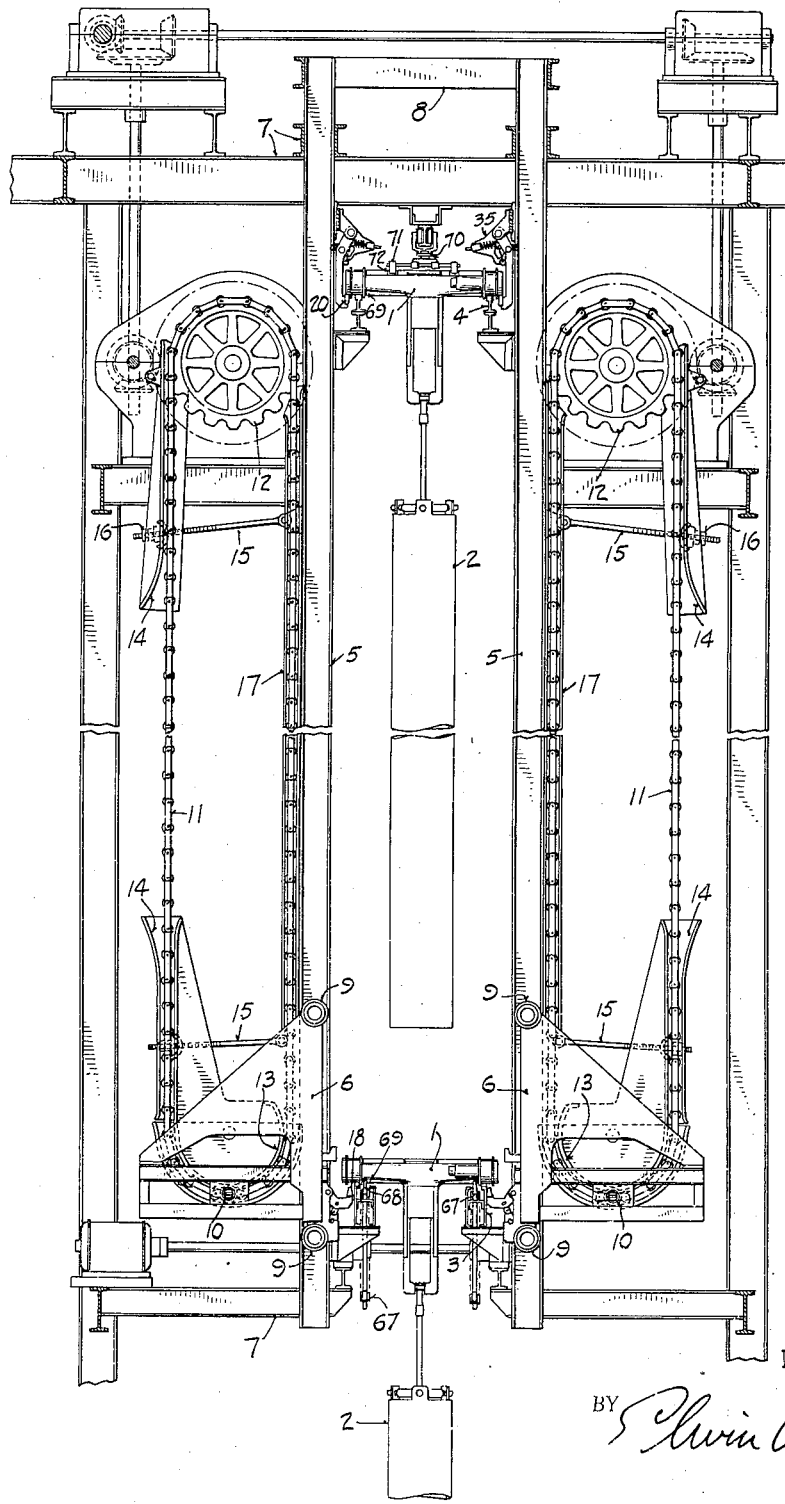
Figure 1 is a side elevation of the elevator showing a transverse section of the conveyer system and showing the elevator at the bottom of the shaft.

The elevator illustrated is designed to lift a truck 1, from which an article 2 such as a section of pipe is suspended, from a conveyer track 3 to a conveyer track 4 at a higher level. With slight modification, the elevator may be designed to operate in a reverse direction for lowering a pipe section from one track level to another.

The elevator shaft comprises four columns 5 of I-cross section arranged in a rectangular group, as illustrated in Fig. 3 with the columns forming channel guides for the carriages 6 on each side. The columns 5 are secured to transverse beams 7 at the top and bottom and support the respective conveyer tracks 3 and 4. Structural members 8 rigidly connect the columns at the top.

The two carriages 6 are triangular box-like frames on opposite sides of the shaft and each is disposed between the two columns at its respective side of the shaft and extends outwardly from the shaft. The carriages 6 are provided with upper and lower rollers 9 at each side for riding in the guideways provided by the channels of the columns 5. The carriages are also provided with movable crossheads 10 for supporting the same and moving them vertically.

The drive or support for the carriages comprises two vertically disposed parallel endless chains 11 for each carriage, the ends of crossheads 10 being secured in corresponding links of the respective chains. Each chain 11 is mounted on a sprocket 12 at the top and guided by a semicircular shoe 13 at the bottom. The chains are driven by the sprockets which are connected by suitable gearing and shafts to a source of power such as an electric motor which also drives the conveyers to move the trucks horizontally along tracks 3 and 4.

The chains 11 are tightened by means of guards 14 pivotally disposed adjacent the chain on the downward or outer side of its path and adapted to be pressed against the chain by means of threaded spindles 15 pivoted at one end to the columns 5 and having their outer ends secured by nuts 16 to the guards 14. The lower guard 14 may be made integral with the shoe 13 and pivot about a supporting pin central to the circular face of the shoe. The upward or inner paths of the chains 11, adjacent the columns 5, are guided in stationary vertical channel members 17.

The carriages 6 on opposite sides of the elevator shaft move in unison upwardly and downwardly in parallel reciprocation guided by the rollers 9 riding in columns 5 and supported by the crossheads 10 secured in the respective chains 11. In Fig. 3, which is a transverse section of one elevator shaft, each carriage 6 is shown between two chains 11 with the crosshead 10 extending across between the two chains and supporting the carriage.

Figure 5:
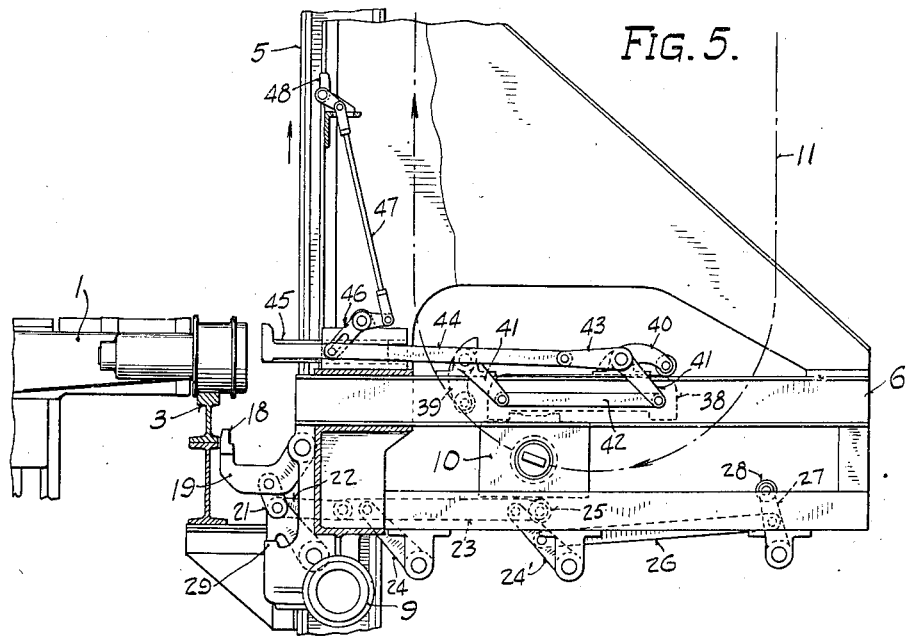
Fig. 5 is a view showing the operation of the truck transfer mechanism when the elevator is at the bottom.
Figure 8:
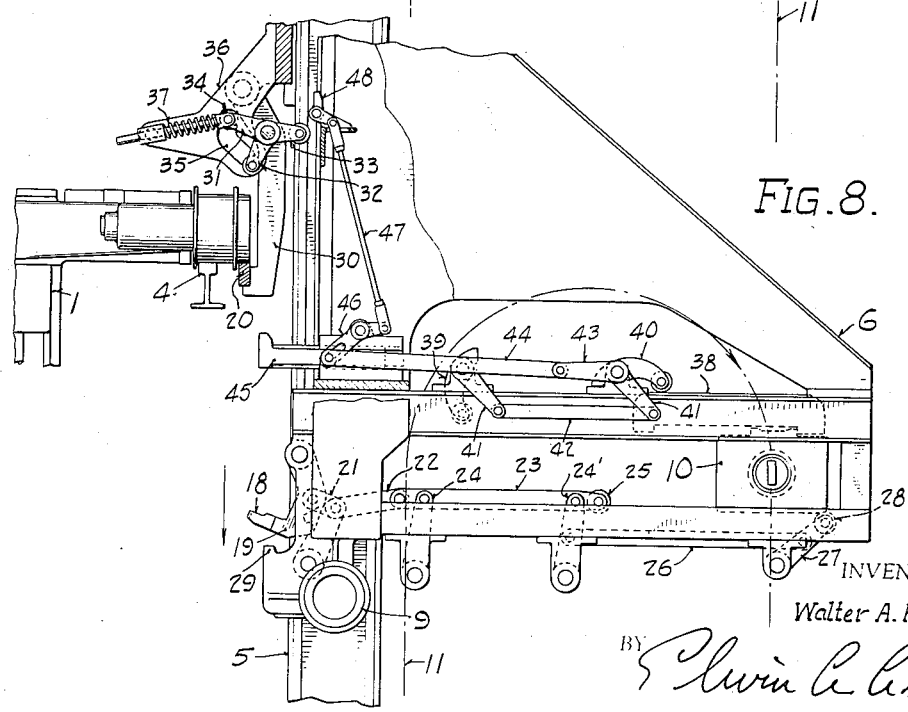
Fig. 8 is a view similar to Figs. 6 and 7 taken at the completion of the transfer of the truck from the elevator to the conveyer and showing the elevator starting downward.

The carriages 6 are provided with rail sections 18 mounted on pivoted arms 19 for lifting a truck 1 from the track 3 to the track 4. These rail sections 18 are pivoted to operating position beneath a truck 1 while the elevator carriages are at the bottom of the shaft as shown in Fig. 5 and lift the truck during upward movement of the carriages. At the top of the shaft, after the truck has been delivered to the auxiliary rails 20, the rail sections 18 are pivoted away from operating position, as shown in Fig. 8, and remain withdrawn until they are again pivoted to position beneath a truck on track 3 at the bottom of the shaft. The rail sections are provided with suitable depressions in their upper surfaces for receiving and retaining the truck wheels so as to prevent horizontal movement of the truck during elevation.

Figure 7:
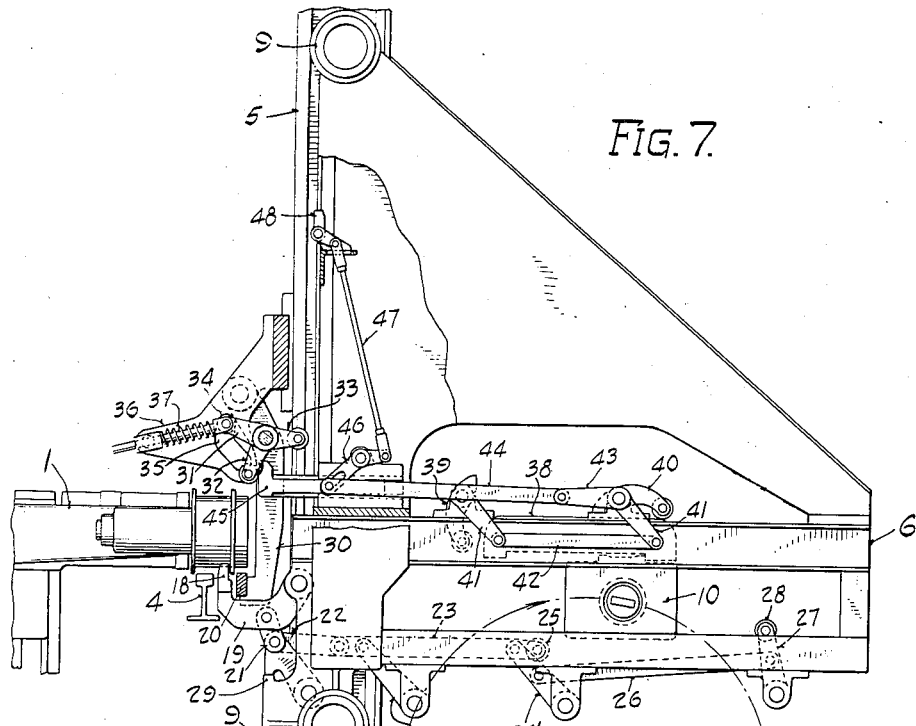
Fig. 7 is a view similar to Fig. 6 taken a short time interval later with the elevator at the top, illustrating operation of the transfer mechanism.

The rail supporting arms 19 are operated by means of a toggle 21 which is connected by link 22 to a main link 23. The link 23 is supported on two parallel cranks 24 and 24' and has a roller 25 at its end disposed in the path of operation of the crosshead 10. The crank 24' is connected by link 26 to a short crank 27 which has a roller 28 on its end disposed also in the path of operation of the crosshead 10. The link 23 and roller 25 are disposed to ride beneath the crosshead 10 and to be held down by it during the period of time when the crosshead is lifting the carriage 6, thereby holding the rail sections 18 in operative lifting position. When, as illustrated in Figs. 7 and 8, the crosshead 10 moves to the right, leaving link 23 and roller 25 and engaging roller 28, it moves the cranks 27, 24' and 24 and the links 26, 23 and 22 to the right, thereby operating toggle 21 to withdraw the rail sections 18 from lifting position. The rail sections are thus retained in withdrawn position during the entire downward movement of the carriages 6. Referring to Fig. 5, as the crosshead 10 moves to the left again at the bottom of the elevator stroke, it engages roller 25 and pushes the several elements to the left until it rides over roller 25 and link 23, thereby operating toggle 21 to position the rail sections 18 beneath the wheels of truck 1. A stop 29 limits the movement of toggle 21 as it passes dead center to insure proper support for the rail sections 18.

The track 3 at the bottom of the elevator is continuous and the trucks 1 are merely lifted from the track by means of the rail sections 18 on carriages 6.

The delivery of the trucks 1 at the top of the elevator to track 4 is complicated by the fact that the track 4 cannot be made continuous as is track 3. The track 4 extends on either side of the elevator shaft, and auxiliary rails 20 normally bridge the gap between the ends of the track. The auxiliary rails 20 of each shaft are mounted for lateral movement to permit a truck 1 to be moved upwardly between them after which they move back into alignment with the track 4 for supporting the truck for delivery to track 4.

The auxiliary rails 20 are mounted on pivoted depending arms 30 which are operated by means of a spring pressed lever 31. The lever 31 is pivoted to arms 30 and has two additional radial arms 32 and 33. The free end of arm 31 has a roller 34 riding in a cam track 35 in a bracket 36 on the columns 5, so that when the roller 34 is at the upper end of the cam 35 it holds the arms 30 in position for rails 20 to support a truck and when the roller 34 is at the lower end of the cam 35 it holds the arms 30 in position for the rails 20 to be inoperative. The cam 35 is curved so as to cause the roller 34 to be held at either end of the cam by means of the compression spring 37.

Movement of the lever 31 is effected by means on the carriage 6 operated by lateral movement of the crosshead 10. A cam block 38 is disposed between the frame parts of carriage 6 for reciprocation with the crosshead 10. The upper surface of the cam block 38 cooperates with two pivoted cam levers 39 and 40 which are connected together by means of cranks 41 and link 42 to operate in unison. A crank lever 43 is mounted on the pivot shaft of lever 40 and is connected by a link 44 to push rod 45 adapted to engage the end of lever arm 32 and to operate arm 31 to its upper position, thereby pivoting arms 30 to position the rails 20 beneath a truck 1, see Fig. 7.

The movement of the push rod 45 by means of a slotted bell crank lever 46 connected thereto and link 47 operates a pivoted projection 48 which engages the end of lever arm 33 to operate arm 31 to its lower position, thereby pivoting arms 30 to inoperative position of the rails 20.

Figure 6:
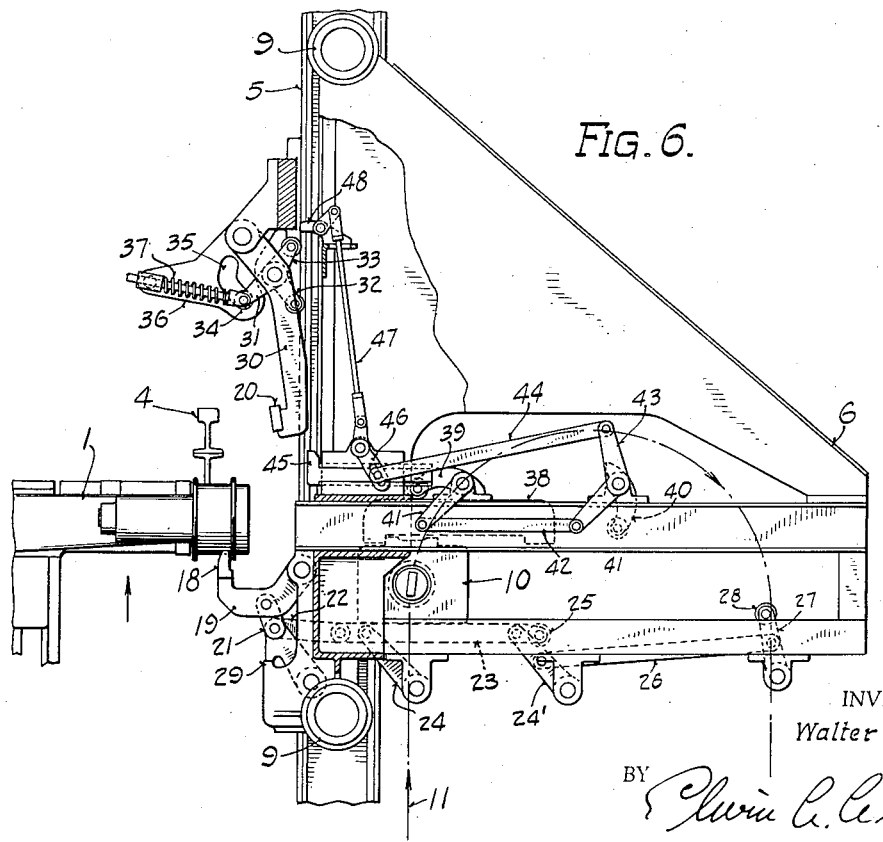
Fig. 6 is a view similar to Fig. 5 when the elevator is near the top.

In operation, the projection 48 is pivoted to horizontal position during initial upward movement of the carriage 6 while push rod 45 is withdrawn and both remain in this position for the full upward movement of the carriage 6. As the carriages 6 approach the top of the elevator shaft, the projections 48 engage arms 33 and cause rails 20 to move outwardly to allow the truck 1 to pass upwardly therebetween. This is clearly shown in Fig. 6. As the crosshead 10 moves to the right, as shown in Fig. 7, it causes push rod 45 to be moved outwardly (to the left) into engagement with arm 32 and at the same time pivots the projection 48 to vertical position where it will clear arm 33 upon downward movement of the carriage 6. Fig. 8 illustrates the several parts in the position they retain during downward movement of the carriage 6. At the bottom of the shaft, as shown in Fig. 5, the crosshead 10 moves to the left, moving cam block 38 with it and effecting a retracting of push rod 45. At the same time projection 48 is pivoted to horizontal position where, as the carriage 6 approaches the top of the shaft, it will again engage arm 33 to retract rails 20.

By providing two cam levers 39 and 40, it is assured that cam block 38 will hold the push rod 45 and projection 48 in desired position during vertical reciprocation of the carriage 6. Lever 39 rides on top of block 38 while the latter is moved to its left hand position and lever 40 rides on top of block 38 while the latter is moved to its right hand position.

Figure 12:
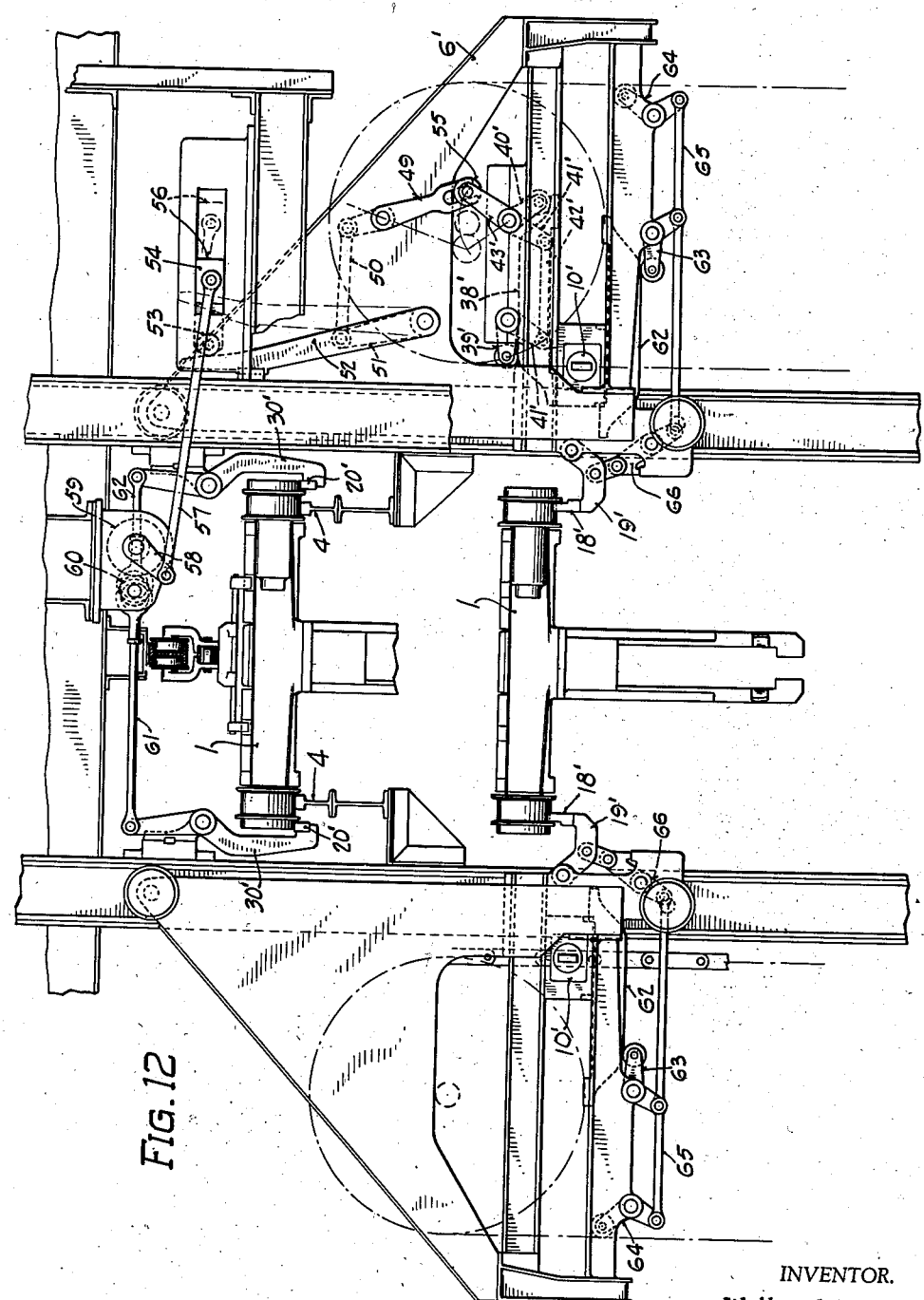
Fig. 12 is a view similar to Fig. 2 showing a modified form of transfer mechanism in substantially the position shown in Fig. 6.

The mechanism just described is provided on each of the carriages 6 to operate the rails 20 on each side of the elevator. In Fig. 12, a modified form of mechanism is shown whereby the operation of both rails 20 is accomplished from only one carriage, thereby insuring simultaneous operation.

In the modified form the crosshead 10' reciprocates a cam block 38' which engages two cam levers 39' and 40'. The cam levers 39' and 40' are joined to cranks 41' and 42'. The crank lever 43' is secured to the same pivot shaft as cam lever 40' and has its free end riding in the slot of a bifurcated lever 49. The latter is connected by link 50 and arm 51 to shift pivoted cam arm 52. As the carriage moves upwardly, the cam arm 52 engages a roller 53 and moves the same to the right. The roller 53 is connected to slide 54 and moves the latter to the right until the lower end of cam 52 passes roller 53. Then the slide 54 is returned to the left by engagement of a roller 55 on the free end of crank 43' with an abutment 56 on the slide. As the crosshead 10' moves to the right, it engages and moves the cam block 38' to the right, thereby effecting movement of the roller 55 to the left and of cam arm 52 to the right to clear roller 53 upon the next downward movement of carriage 6'.

The reciprocation of slide 54, through link 57, crank 58, gears 59 and 60 and eccentric push rods 61 and 62, effects a pivoting of the arms 30' for moving the auxiliary rails 20' in and out to accommodate movement and support of the truck 1. As the carriage 6' approaches the top of its travel, the cam 52 moves roller 53 and slide 54 to the right, thereby effecting operation of the eccentrics to separate rails 20' and allow a truck 1 to move upwardly therebetween. As the crosshead 10' moves to the right, it moves cam block 38' and thereby causes roller 55, which is now in horizontal alignment with abutment 56, to engage said abutment and move slide 54 to the left, thereby effecting operation of the eccentrics to close the rails 20' and support the truck 1. The roller 53 has also moved to the left with the slide, the cam 52 having moved up beyond the roller to permit its clearing the lower end of the cam. At the same time, movement of lever 49, link 50 and arm 51 causes cam arm 52 to pivot to the right to a position where it will clear the roller 53 when the carriage is moving downwardly. When the carriage 6' reaches the bottom of the elevator shaft and cam block 38' again moves to the left, it swings cam 52 to the left in position to again engage roller 53.

The rails 20' and the several operating members are retained in position during upward and downward movement of the carriage by reason of the eccentric members 61 and 62 which are preferably at dead center during this period.

Fig. 12 also shows a slight modification of the levers for operating the track sections 18', and in which a cam block 62 is employed to engage the pivoted cam levers 63 and 64 which are connected together by link 65 and to a lever 66 for pivoting the arms 19'.

By providing cam blocks, it is possible to allow a certain amount of free lateral movement of the crosshead before operating the several parts. Adjustments are also readily made.

Although it constitutes no part of the present invention, attention is called to Figs. 1 and 2 to illustrate the horizontal conveyer system. The lower track 3 is continuous and is supported upon the main frame work of the building. Successive trucks 1 are moved therealong to the elevator by means of two horizontal chains 67 each having means 68 thereon for engaging downwardly extending lugs 69 on either side of the trucks. The trucks are moved along continuously in spaced relation. As they reach the elevator they are raised by carriages 6 to the auxiliary rails 20. As the carriages 6 return for another truck, the endless chain 70 brings means 71 into engagement with a lug 72 on top of the truck 1 and moves the truck onto and along the track 4, leaving rails 20 free for receiving another truck.

By employing the same motor to drive the elevator chains 11 and the conveyer chains 67 and 70, the operation of the several parts is obtained in synchronism. Instead of chains, other means such as cables might be employed.

I claim:
1. An elevator for transferring a conveyer truck between different parallel track levels, comprising a plurality of vertical columns defining a shaft, a pair of carriages on opposite sides of said shaft disposed for vertical reciprocation, means on each of said carriages for supporting a truck, means for retracting said supporting means at predetermined time cycles, and means for operating said carriages simultaneously and in synchronism.

2. An elevator comprising a carriage disposed for vertical reciprocation, means on said carriage for receiving and supporting an article to be transferred between different levels, means to retract said supporting means at predetermined time cycles, and means for operating said carriage and said retracting means.

3. An elevator comprising a carriage disposed for vertical reciprocation, means on said carriage for receiving and supporting an article to be transferred between different levels, means to retract said supporting means at predetermined time cycles, a pair of endless chains disposed in parallel adjacent the path of said carriage, and a crosshead extending between said chains and supporting said carriage, said crosshead being reciprocated both vertically and laterally by the movement of said chains, the vertical reciprocation of said crosshead effecting vertical movement of said carriage and the lateral reciprocation of said crosshead effecting retraction and positioning of said article support.

4. In combination, an elevator carriage adapted to transfer a conveyer truck between different track levels, a conveyer track at the upper level having its end adjacent the elevator shaft, an auxiliary rail at one level of the elevator shaft for receiving a truck from said track or for delivering a truck thereto, and means operated in a predetermined time cycle with said carriage to move said rail laterally to clear the passage of the truck as the carriage moves the truck vertically.

5. In combination, an elevator carriage adapted to transfer a conveyer truck between different track levels, a crosshead for supporting said carriage and mounted for lateral movement relative thereto, means on said carriage for supporting an article to be transferred, and means operable by the lateral movement of said crosshead to effect a withdrawal and positioning of said article supporting means.

6. In combination, an elevator carriage adapted to transfer a conveyer truck between different track levels, a conveyer track disposed at the top of the elevator shaft, means for moving said track laterally to clear the passage of the truck as the carriage moves the truck vertically, means on said carriage for supporting said truck during vertical movement of the carriage, and means for operating both of said means in predetermined cycle relationship with the movement of said carriage.

7. An elevator comprising a carriage disposed for vertical reciprocation, a pair of endless chains disposed in parallel adjacent the path of said carriage, a crosshead extending between said chains and supporting said carriage and disposed for reciprocation both vertically to reciprocate said carriage, and laterally at the extremities of the vertical reciprocation to provide a dwell in the movement of said carriage, and means for driving said chains in parallel continuously to effect vertical and lateral reciprocation of said crosshead and vertical reciprocation of said carriage.

8. An elevator comprising a vertical shaft, carriages disposed for vertical reciprocation on opposite sides of said shaft and having means for cooperating to receive and support an article in said shaft, and means operating in synchronism for simultaneously vertically reciprocating said carriages.

9. An elevator comprising a vertical shaft, and carriages disposed for vertical reciprocation on opposite sides of said shaft and having means for cooperating to receive and support an article in said shaft, said carriages being supported by endless chains driven from a common source of power and disposed to give vertical movement thereto for lifting or lowering the article.

10. An elevator comprising a vertical shaft, a pair of endless chains on one side of said shaft and having a circuit extending vertically adjacent said shaft, a corresponding pair of endless chains on the opposite side of said shaft, a crosshead connecting the endless chain of each pair of chains, said crossheads being disposed in the same horizontal plane, means supported by said crossheads for vertical reciprocation and having means for receiving and supporting an article in said shaft, and means for driving said chains simultaneously and at the same speed.

11. An elevator comprising a vertical shaft, a pair of endless chains on one side of said shaft and having a circuit extending vertically adjacent said shaft, a corresponding pair of endless chains on the opposite side of said shaft, a crosshead connecting the endless chain of each pair of chains, said crossheads being disposed in the same horizontal plane, a carriage supported by each crosshead on opposite sides of said shaft, means on said carriages for cooperating to receive and support an article in said shaft, and means for driving said chains simultaneously and at the same speed to effect vertical reciprocation of said carriages.

12. An elevator comprising a vertical shaft defined by four channel columns, a pair of endless chains on one side of said shaft and having a circuit extending vertically adjacent said shaft, a corresponding pair of endless chains on the opposite side of said shaft, a crosshead connecting the endless chain of each pair of chains, said crossheads being disposed in the same horizontal plane, a carriage supported by each crosshead on opposite sides of said shaft, said carriages having rollers riding in said channel columns to guide the carriages in their vertical reciprocation, means on said carriages for cooperating to receive and support an article in said shaft, and means for driving said chains simultaneously and at the same speed to effect vertical reciprocation of said carriages.

WALTER A. KUEBLER.